US011210992B2

(12) United States Patent
Duan

(10) Patent No.: US 11,210,992 B2
(45) Date of Patent: Dec. 28, 2021

(54) DISPLAY CONTROLLER HAVING AUXILARY CIRCUITS IN TWO FPGAS IN CONNECTION

(71) Applicant: BOE Technology Group Co., Ltd., Beijing (CN)

(72) Inventor: Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 14 days.

(21) Appl. No.: 16/649,356

(22) PCT Filed: Aug. 21, 2019

(86) PCT No.: PCT/CN2019/101816
§ 371 (c)(1),
(2) Date: Mar. 20, 2020

(87) PCT Pub. No.: WO2020/192004
PCT Pub. Date: Oct. 1, 2020

(65) Prior Publication Data
US 2021/0233459 A1  Jul. 29, 2021

(30) Foreign Application Priority Data
Mar. 26, 2019  (CN) .......................... 201910234875.0

(51) Int. Cl.
*G06T 3/40* (2006.01)
*G09G 3/20* (2006.01)

(52) U.S. Cl.
CPC ......... *G09G 3/2096* (2013.01); *G06T 3/4053* (2013.01); *G09G 2310/08* (2013.01);
(Continued)

(58) Field of Classification Search
None
See application file for complete search history.

(56) References Cited

U.S. PATENT DOCUMENTS 6,919,968 B1 *  7/2005 Petschik ................. G06T 3/403
                                                    358/1.1
2010/0156955 A1   6/2010 Kimura
(Continued)

FOREIGN PATENT DOCUMENTS

CN   101315756 A   12/2008
CN   102257558 A   11/2011
(Continued)

OTHER PUBLICATIONS

International Search Report & Written Opinion dated Jan. 2, 2020, regarding PCT/CN2019/101816.
(Continued)

*Primary Examiner* — Joni Hsu
(74) *Attorney, Agent, or Firm* — Intellectual Valley Law, P.C.

(57) ABSTRACT

A display controller is provided. The display controller includes n field-programmable gate arrays (FPGAs) (n is an integer greater than 1). A respective one of the n FPGAs includes a first input circuit and an output circuit and a first process circuit connected between the first input circuit and the output circuit. The first input circuit is configured to receive a respective one first sub-image corresponding to the respective one of the n FPGAs. The n first sub-images are combined to form one frame of initial image. The first process circuit is configured to enhance image-resolution of the respective one first sub-image to obtain a respective one second sub-image and the output circuit is configured to deliver the respective one second sub-image corresponding to the respective one of the n FPGAs to a timing-controller.

16 Claims, 11 Drawing Sheets

(52) U.S. Cl.
CPC ..... *G09G 2340/04* (2013.01); *G09G 2360/06* (2013.01); *G09G 2370/08* (2013.01)

(56) References Cited

U.S. PATENT DOCUMENTS

| | | | |
|---|---|---|---|
| 2010/0265246 A1* | 10/2010 | Chen | G09G 3/36 |
| | | | 345/214 |
| 2013/0222386 A1 | 8/2013 | Tannhauser et al. | |
| 2015/0185934 A1 | 7/2015 | Leng | |
| 2016/0210727 A1* | 7/2016 | Yang | G06T 3/403 |
| 2018/0013978 A1 | 1/2018 | Duan et al. | |
| 2018/0063498 A1 | 3/2018 | Duan | |

FOREIGN PATENT DOCUMENTS

| | | |
|---|---|---|
| CN | 103208271 A | 7/2013 |
| CN | 103974115 A | 8/2014 |
| CN | 105141876 A | 12/2015 |
| CN | 204857142 U | 12/2015 |
| CN | 105704407 A | 6/2016 |
| CN | 106710515 A | 5/2017 |
| CN | 109064980 A | 12/2018 |
| GB | 2499635 A | 8/2013 |
| JP | 2007060437 A | 3/2007 |
| TW | 201124959 A | 7/2011 |
| WO | 0059229 A1 | 10/2000 |

OTHER PUBLICATIONS

First Office Action in the Chinese Patent Application No. 201910234875.0 dated Apr. 9, 2020; English translation attached.

\* cited by examiner

DISPLAY CONTROLLER HAVING AUXILARY CIRCUITS IN TWO FPGAS IN CONNECTION

CROSS-REFERENCE TO RELATED APPLICATION

This application is a national stage application under 35 U.S.C. § 371 of International Application No. PCT/CN2019/101816, filed Aug. 21, 2019, which claims priority to Chinese Patent Application No. 201910234875.0, filed Mar. 26, 2019. Each of the forgoing applications is herein incorporated by reference in its entirety for all purposes.

TECHNICAL FIELD

The present invention relates to display technology, more particularly, to a display controller, a method thereof, a display control system, and a display apparatus.

BACKGROUND

A display apparatus includes basically a display panel and a display control system configured to control the display panel to display images. The display panel has a certain image-resolution which is in a trend to move from relative low resolution in 4K to a higher resolution in 8K or even higher. The display control system usually is configured to support certain upper limit of resolution of images displayed by the display panel due to intrinsic data handling capability or consideration of lowering cost. While, improved techniques of designing a display controller based on low-cost field-programmable gate arrays (FPGAs) in the display control system for supporting high-resolution display panel are desired.

SUMMARY

In an aspect, the present disclosure provides a display controller. The display controller includes n field-programmable gate arrays (FPGAs), where n is an integer greater than 1. A respective one of the n FPGAs includes a first input circuit and an output circuit and a first process circuit connected between the first input circuit and the output circuit. The first input circuit is configured to receive a respective one first sub-image corresponding to the respective one of the n FPGAs. In the embodiment, n first sub-images respectively corresponding to the n FPGAs is combined to form one frame of initial image. The first process circuit is configured to enhance image-resolution of the respective one first sub-image corresponding to the respective one of the n FPGAs to obtain a respective one second sub-image corresponding to the respective one of the n FPGAs. The output circuit is configured to deliver the respective one second sub-image corresponding to the respective one of the n FPGAs to a timing-controller.

Optionally, the image-resolution of the second sub-image is at least two times of that of the first sub-image.

Optionally, the respective one of the n FPGAs further includes an auxiliary circuit connected to the first process circuit. The auxiliary circuit is configured to obtain an auxiliary sub-image corresponding to the respective one of the n FPGAs. The auxiliary sub-image is a sub-portion within the one frame of initial image physically next to the first sub-image corresponding to the respective one of the n FPGAs. The auxiliary circuit is further configured to enhance image-resolution of the first sub-image corresponding to the respective one of the n FPGAs based on the auxiliary sub-image.

Optionally, the first input circuit in a respective one of the n FPGAs is configured to couple with the auxiliary circuit therein via the first process circuit therein. The auxiliary circuits respectively in two of the n FPGAs are in connection. Two first sub-images corresponding respectively to the two of the n FPGAs are two neighboring portions in the one frame of initial image.

Optionally, the auxiliary circuit is configured to receive a reference sub-image sent from another auxiliary circuit in connection. The reference sub-image includes at least one portion of the first sub-image corresponding to a respective one of the n FPGAs including the another auxiliary circuit. Optionally, the auxiliary circuit is configured to determine the auxiliary sub-image corresponding to the respective one of the n FPGAs based on the reference sub-image. The auxiliary sub-image includes at least one portion of the reference sub-image.

Optionally, a total number of rows of pixels in the reference sub-image is equal to a total number of rows of pixels in the first sub-image. A total number of columns of pixels in the reference sub-image is one half of a total number of columns of pixels in the first sub-image.

Optionally, the respective one of the n FPGAs further includes a select circuit configured to connect the first input circuit with the first process circuit, and a second input circuit having a target interface and being connected with the output circuit via the select circuit. The select circuit is configured to select one of the first input circuit and the second input circuit to form a conduction path with the output circuit. The output circuit is configured to deliver the respective one second sub-image corresponding to the respective one of the n FPGAs to the timing-controller when the output circuit is in the conduction path with the first input circuit which receives the corresponding one first sub-image.

Optionally, a respective one output circuit of the respective one of the n FPGAs is configured to deliver an image to the timing-controller based on V-By-One standard protocol.

Optionally, the respective one of the n FPGAs further includes a second process circuit connected between the second input circuit and the select circuit. A respective one second input circuit of the respective one of the n FPGAs is configured to receive a respective group of n groups of third sub-images corresponding to the respective one of the n FPGAs from the target interface. The n groups of third sub-images respectively corresponding to the n FPGAs are combined sequentially along row direction of pixels to form one frame of target image. The respective group of the n groups of third sub-images includes m number of third sub-images sequentially along column direction of pixels, where m is an integer greater than 1. A respective one second process circuit of the respective one of the n FPGAs is configured to divide the respective group of the n groups of third sub-images to multiple fourth sub-images. A total number of rows of pixels of a respective one fourth sub-image is equal to a total number of rows of pixels of the target image.

Optionally, a respective one output circuit of the n FPGAs is configured to deliver the multiple fourth sub-images to the timing-controller when the output circuit is in the conduction path with the second input circuit.

Optionally, the respective one output circuit of the n FPGAs further includes a scan sub-circuit connected to both the first process circuit and the select circuit and an output sub-circuit connected to the timing-controller. The scan sub-circuit is configured to perform a scan process to the respective one second sub-image when the output circuit is in the conduction path with the first input circuit to make a scanning rate associated with the respective one second sub-image to be a target scanning rate set by the timing-controller. Or the scan sub-circuit is configured to perform a scan process to a respective one of the multiple fourth sub-images when the output circuit is in the conduction path with the second input circuit to make a scanning rate associated with the respective one of the multiple fourth sub-images to be a target scanning rate set by the timing-controller.

Optionally, respective one output circuit of the n field-programmable gate arrays further includes a synchronize sub-circuit connected to the scan sub-circuit and the output sub-circuit. The synchronize sub-circuit is configured to perform a clock signal synchronization with each and every other synchronize sub-circuits of a corresponding (n-1) number of field-programmable gate arrays other than the respective one field-programmable gate array based on at least a single target clock signal before the output sub-circuit sends the respective one second or fourth sub-image that has been subjected to the scan process to the timing-controller.

Optionally, the respective one output circuit of the n field-programmable gate arrays further includes a first adjust sub-circuit configured to connect both the first process circuit and the select circuit with the scan sub-circuit. The first adjust sub-circuit is configured to perform a first image process to the respective one second or fourth sub-image in red-green-blue color mode for enhancing image quality before the output sub-circuit sends the respective one second or fourth sub-image that has been subjected to the first image process.

Optionally, the respective one select circuit of the n FPGAs includes a first select sub-circuit, a second adjust sub-circuit, and a second select sub-circuit connected to the first select sub-circuit and the first select sub-circuit. The auxiliary circuit is connected to a first input terminal of the first select sub-circuit. The second process circuit is connected to a second input terminal of the first select sub-circuit. The first process circuit is connected to a first output terminal of the second select sub-circuit. The output circuit is connected to a second output terminal of the second select sub-circuit. The first select sub-circuit is configured to select one of the first input terminal and the second input terminal to be in a conduction path with the second adjust sub-circuit. The second select sub-circuit is configured to select the first output terminal to connect with the first process circuit when the first input terminal is connected to the second adjust sub-circuit and to select the second output terminal to connect with the second adjust sub-circuit when the second input terminal is connected to the second adjust sub-circuit.

Optionally, the second adjust sub-circuit is configured to perform a second image process to the respective one first sub-image and the respective one auxiliary sub-image corresponding to the respective one of the n FPGAs for converting image color codes thereof to a target color mode when the first input terminal is connected to the second adjust sub-circuit. Optionally, the second adjust sub-circuit is configured to perform a second image process to the respective multiple fourth sub-images corresponding to the respective one of the n FPGAs for converting image color modes thereof to a target color mode when the second input terminal is connected to the second adjust sub-circuit.

In another aspect, the present disclosure provides a display control system including the display controller described herein, a system-on-chip, and a timing-controller. The system-on-chip is coupled to the display controller to provide a respective one of n first sub-images corresponding to a respective one of n FPGAs in the display controller to generate a respective one second sub-image. The timing-controller is coupled to the display controller to receive n second sub-images generated from the n first sub-images which are n portions of one frame of initial image.

In another aspect, the present disclosure provides a display apparatus including a display panel and the display control system described above. The display apparatus also includes a timing-controller connected between the display control system and the display panel.

In another aspect, the present disclosure provides a display control method using a display controller. The display controller includes n FPGAs, where n is an integer greater than 1. A respective one of the n FPGAs includes a first input circuit and an output circuit and a first process circuit connected between the first input circuit and the output circuit. The method includes a step of receiving a respective one of n first sub-images corresponding to a respective one of the n FPGAs by the first input circuit. The method further includes a step of combining n first sub-images respectively corresponding to the n FPGAs into one frame of initial image. Additionally, the method includes a step of processing, by the first process circuit, the respective one of the n first sub-images corresponding to the respective one of the n FPGAs to obtain a respective one second sub-image with enhanced image-resolution corresponding to the respective one of the n FPGAs. Furthermore, the method includes a step of sending, by the output circuit, the respective one second sub-image corresponding to the respective one of the n FPGAs to a timing-controller.

Optionally, the respective one of the n FPGAs further includes an auxiliary circuit connected to the first process circuit. Then, the method further includes a step of obtaining, by the auxiliary circuit, an auxiliary sub-image corresponding to the respective one of the n FPGAs, wherein the auxiliary sub-image is a sub-portion within the one frame of initial image physically next to the first sub-image corresponding to the respective one of the n FPGAs. Furthermore, the method includes a step of enhancing, by the auxiliary circuit, image-resolution of the first sub-image corresponding to the respective one of the n FPGAs based on the auxiliary sub-image.

Optionally, the method further includes a step of coupling the first input circuit in a respective one of the n FPGAs with the auxiliary circuit therein via the first process circuit therein. The auxiliary circuits respectively in two of the n FPGAs are in connection. Two first sub-images corresponding respectively to the two of the n FPGAs are two neighboring portions in the one frame of initial image.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
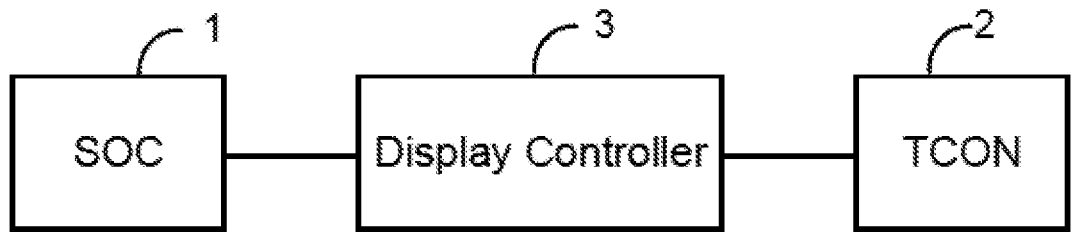
FIG. 1 is a block diagram of a display control system according to an embodiment of the present disclosure.

In the related art, a display controller in existing display control system does not suitable for controlling high-resolution display panel to display images. Accordingly, the present disclosure provides, inter alia, a display controller, as well as a display control system, that supports for driving high-resolution display panel with low-cost field-programmable gate arrays (FPGAs), and a display control method thereof that substantially obviate one or more of the problems due to limitations and disadvantages of the related art. In one aspect, the present disclosure provides a display control system as shown in FIG. 1. The display control system includes a system-on-chip (SOC) 1 connected to a display controller 3 coupled to a timing-controller 2. The SOC 1 is able to generate or provide control signals, input image data, etc. The display controller 3 is designed to process the input image data according to the control signals and requirement of displaying a high-resolution image. The timing-controller 2 (or timer control register, a so-called TCON) is configured to couple with the display controller to pass the processed image data to a high-resolution display panel to display the image.

Figure 2:
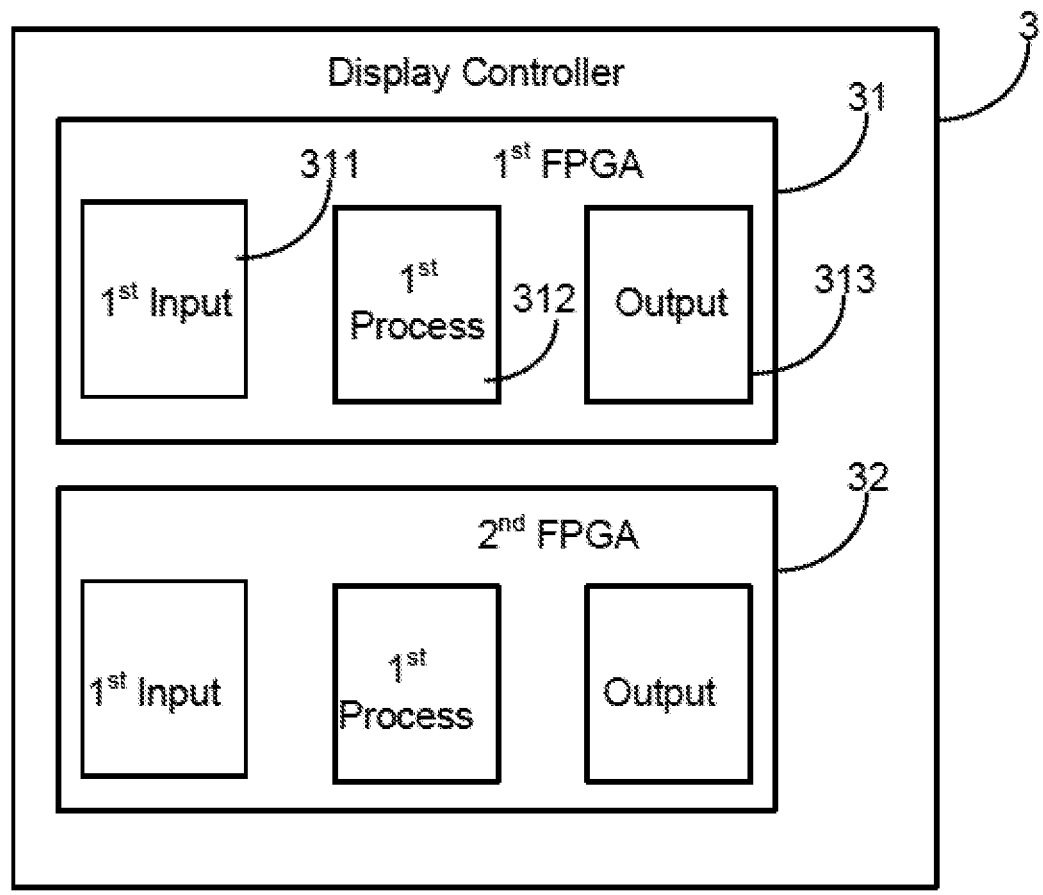
FIG. 2 is a block diagram of a display controller according to an embodiment of the present disclosure.

FIG. 2 is a block diagram of a display controller in FIG. 1 according to an embodiment of the present disclosure. Referring to FIG. 2, the display controller 3 includes n field-programmable gate arrays (FPGAs) 31 where n is an integer greater than 1 (n≥2). In a specific embodiment as shown in FIG. 2, there are two FPGAs, i.e., n=2. A first FPGA 31 is configured to be substantially the same as a second FPGA 32. For example, the first FPGA 31 includes a first input circuit 311, a first process circuit 312, and an output circuit 313. The first process circuit 312 is electrically connected to both the first input circuit 311 and the output circuit 313. The first input circuit 311 is configured to connect to the SOC 1 of the display control system 1 (of FIG. 1). The output circuit 313 is configured to connect to the timing-controller 2 (of FIG. 1). The second FPGA 32 is also configured the same way in association with the SOC 1 and the timing-controller 2.

The first input circuit 311 of the first FPGA 31 is configured to receive a first sub-image sent from the SOC to the first FPGA 31. Optionally, the first sub-image is a respective one of n first sub-images that can be combined to form one frame of initial image. The respective one of the n first sub-images of the one frame of initial image outputted from the SOC will be transported to the first input circuit 311 of the first FPGA 31.

The first process circuit 312 of the first FPGA 31 is configured to process the first sub-image corresponding to the first FPGA 31 to enhance image-resolution to obtain a second sub-image corresponding to the first FPGA 31. Optionally, the process to enhance image-resolution is achieved by pixel value insertion. The output circuit 313 of the first FPGA 31 is configured to output the second sub-image corresponding to the FPGA 31.

Optionally, the image-resolution of the second sub-image can be two folds of that of the first sub-image. Optionally, an image made by combining n second sub-images corresponding respectively to the n FPGAs can be also two folds of that of the initial image (i.e., the one frame of image formed with the combined n first sub-images corresponding respectively to the n FPGAs). For example, the first sub-image includes 2160 rows of pixels and 1920 columns of pixels. The second sub-image includes 4320 rows of pixels and 3840 columns of pixels. Optionally, the image-resolution of the second sub-image can be other number of folds (such as 1.5, or 3) of that of the first sub-image, so does the image made by combining n second sub-images versus the initial image.

In the example, the display controller 3 can include two FPGAs, a first FPGA 31 and a second FPGA 32. SOC received an initial image that may include 2160 rows and 3840 columns of pixels with a 4K image-resolution. A first sub-image corresponding to either the first FPGA 31 or the second FPGA 32 can include 2160 rows and 1920 columns of pixels. A second sub-image corresponding to either the first FPGA 31 or the second FPGA 32 can include 4320 rows and 3840 columns of pixels. As a result, an image made by combining the two second sub-images can include 4320 rows and 7680 columns of pixels, with an 8K image-resolution. Optionally, the initial image can include 2160 rows and 4096 columns of pixels. Optionally, the initial image can have any lower image-resolution that can be enhanced by the process supported via the first FPGA to obtain an image with higher image-resolution.

In general, the display controller contains n FPGAs. Each FPGA is configured to process a first sub-image received from SOC to enhance image-resolution to obtain a second sub-image with higher resolution, and to send the second sub-image to the timing-controller 2. The timing-controller 2 then is configured to deliver the higher resolution images to a display panel. Therefore, the display control system of FIG. 1 including the display controller of FIG. 2 is configured to control a high-resolution display panel to display images. Each of the n FPGAs in the display controller 3 can be formed with circuitry structure made by reduced manufacture cost as it only needs to support processing less data associated with the first sub-image of lower resolution.

Optionally, the first input circuit 311 in each (first) FPGA in the display controller 3 can be configured with V-By-One display digital interface standard or with Low-Voltage Differential Signaling (LVDS) standard for receiving the first sub-image sent from the SOC 1. Optionally, the first input circuit 311 can receive the first sub-image through multiple channels parallel-transported data stream. For example, multiple paths include 4 or 5 channels. The multi-channel parallel-transport data stream can be set to be along the row direction of pixels in the first sub-image sequentially distributed over multiple image regions. Optionally, the output circuit 313 in each (first) FPGA is configured to send an image to the timing-controller 2 based on V-By-One standard protocol. The image can be any one processed by the respective one of the n FPGAs and required to be sent to the timing-controller 2 from the output circuit.

Figure 4A:
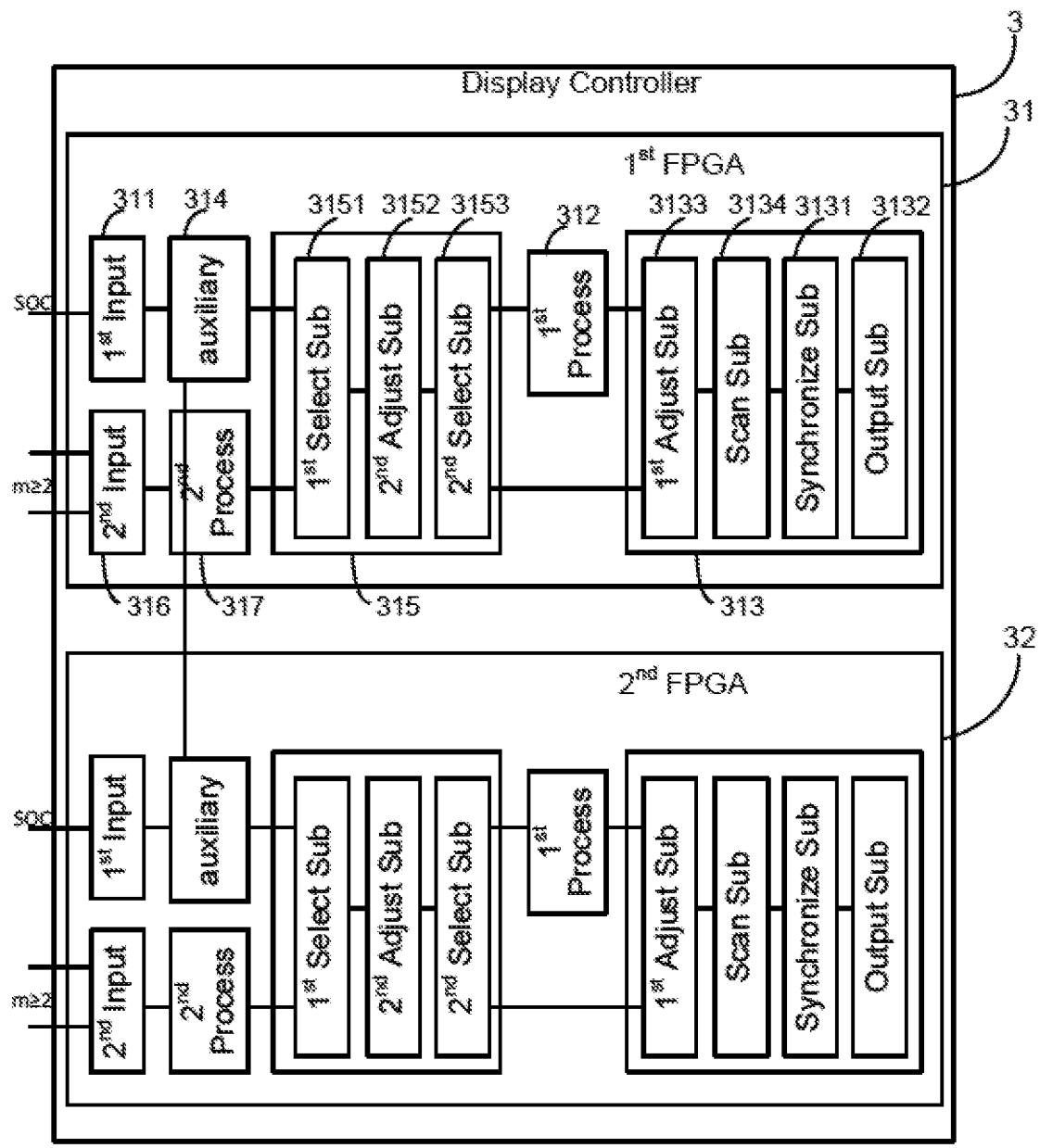
FIG. 4A is a block diagram of a display controller according to another embodiment of the present disclosure.

FIG. 4A is a block diagram of a display controller according to another embodiment of the present disclosure. Referring to FIG. 4A which is provided based on FIG. 2, the display controller 3 comprises two (n=2) FPGAs, e.g., the first FPGA 31 and the second FPGA 32, respectively configured in a same type of circuitry. As an example, the first FPGA 31 includes a first process circuit 312 connected to an auxiliary circuit 314. The auxiliary circuit 314 is configured to obtain an auxiliary sub-image corresponding to the FPGA 31. The auxiliary sub-image is one sub-image portion that is physically next to the first sub-image corresponding to the FPGA 31 in the (one frame of) initial image. The first process circuit 312 of the FPGA 31 is configured to perform a process to enhance image-resolution of the first sub-image based on the auxiliary sub-image.

Figure 3:
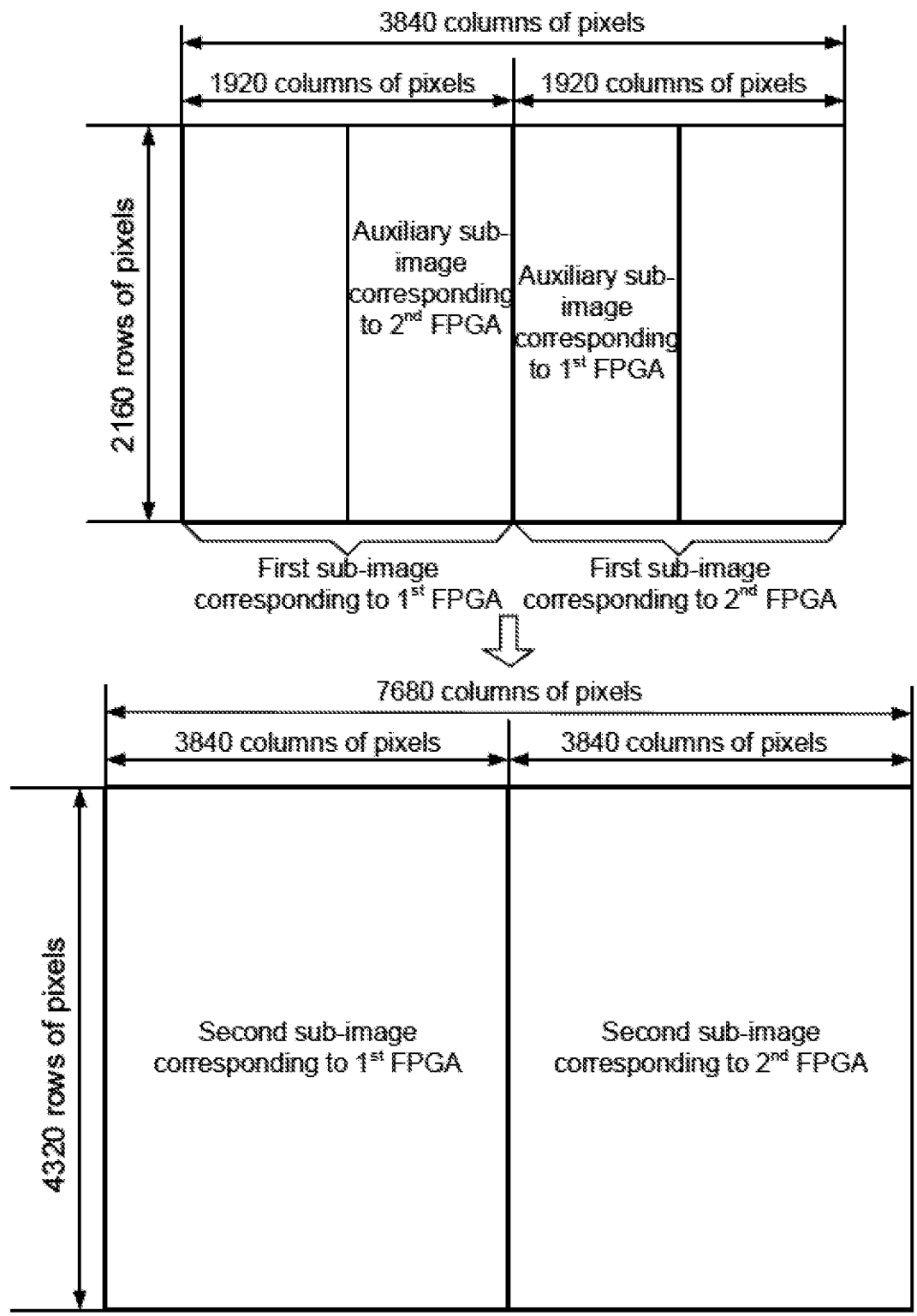
FIG. 3 is a schematic diagram of one frame of initial image according to an embodiment of the present disclosure.

For example, referring to FIG. 3, the first sub-image corresponding to the first FPGA is one as indicated by a first bracket located at the left side of the initial image. Next one sub-image as indicated by a second bracket located at the right side of the initial image is the first sub-image corresponding to the second FPGA. Optionally, the auxiliary sub-image corresponding to the first FPGA is a portion of a first sub-image corresponding to the second FPGA next to a light-side edge of the first sub-image corresponding to the first FPGA in the initial image. Optionally, the auxiliary sub-image is the first sub-image corresponding to the second FPGA itself next to the right-side edge of the first sub-image in the initial image. Note, the auxiliary sub-image corresponding to a respective FPGA is not limited in its size as long as it at least belongs to a portion of the initial image outside the first sub-image corresponding to the respective FPGA. Similarly, referring to FIG. 3, the auxiliary sub-image corresponding to the second FPGA is at least a portion in the initial image next to left-side edge of the first sub-image corresponding to the second FPGA, i.e., the portion that is located within the first sub-image corresponding to the first FPGA and next to the left-side edge of the first sub-image corresponding to the second FPGA.

Figure 4B:
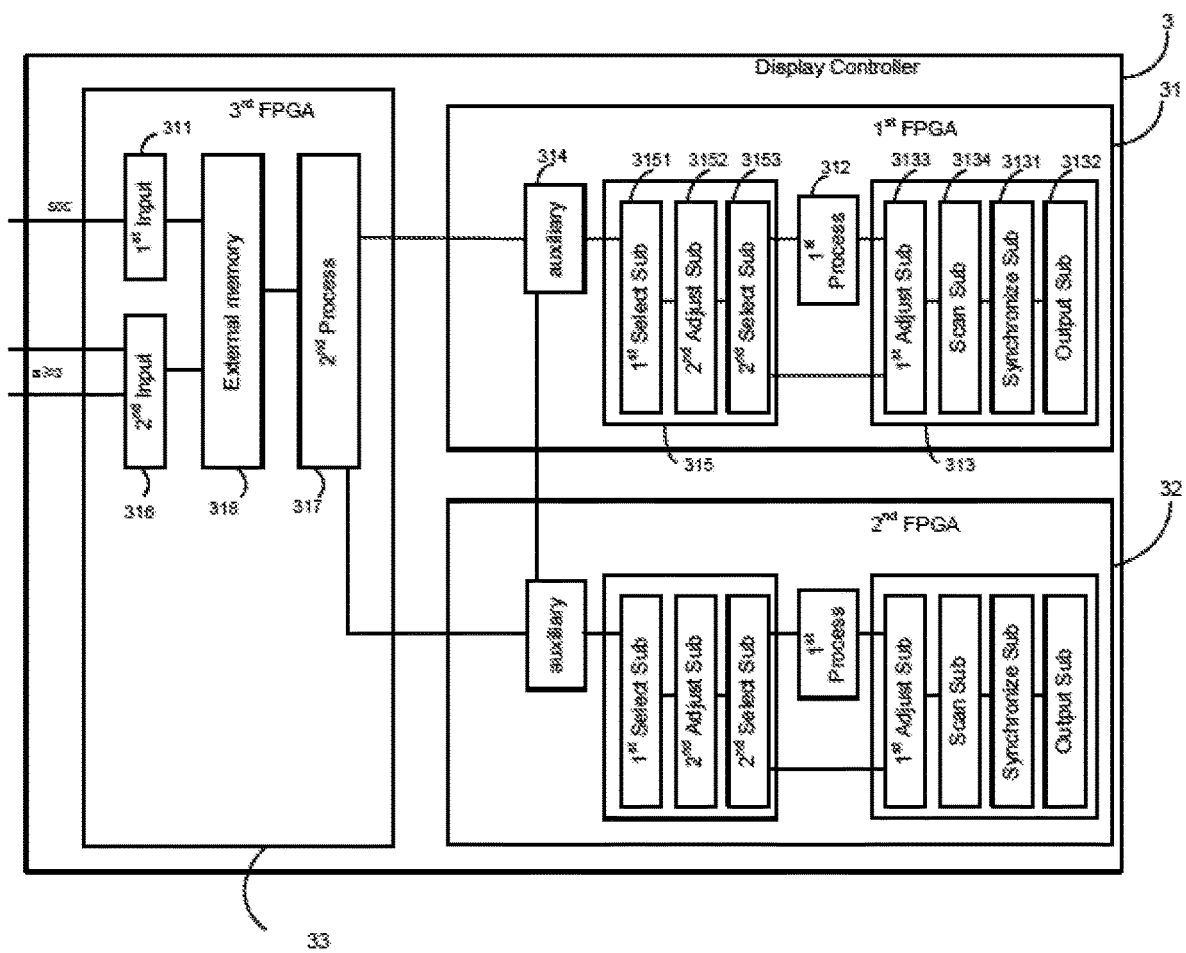
FIG. 4B is a block diagram of a display controller according to yet another embodiment of the present disclosure.
Figure 4C:
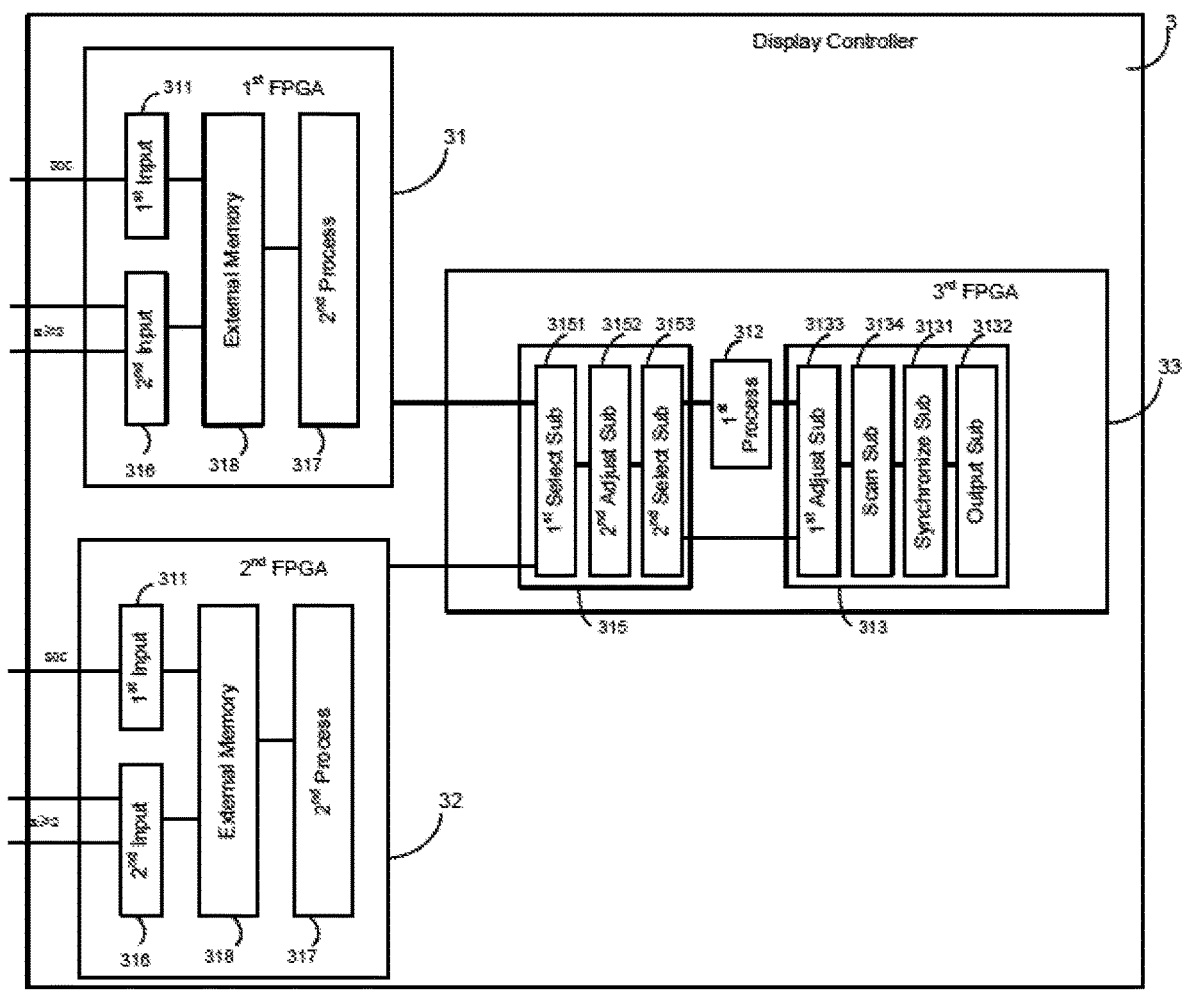
FIG. 4C is a block diagram of a display controller according to yet another embodiment of the present disclosure.

Optionally, referred to FIG. 4A again, in the first FPGA 31, the first input circuit 311 is electrically connected with the first process circuit 312 through the auxiliary circuit 314. Optionally, the display controller 3 comprises three (n=3) FPGAs, e.g., the first FPGA 31, the second FPGA 32, and the third FPGA 33, respectively configured in a same type of circuitry. Among the n (two or more) FPGAs in the display controller 3, two auxiliary circuits respectively in two FPGAs are electrically connected to each other if two first sub-images corresponding to the respective two FPGAs are neighboring sub-images in the initial image. For example, the n FPGAs includes a first FPGA 31 and a second FPGA 32 (FIG. 4A). If a first sub-image corresponding to the first FPGA 31 is a neighboring sub-image in the initial image to the first sub-image corresponding to the second FPGA 32, then the auxiliary circuit in the first FPGA 31 is electrically connected to the auxiliary circuit in the second FPGA 32. In another example, the n=3 FPGAs includes a first FPGA 31, a second FPGA 32, and a third FPGA 33 (FIG. 4B). Optionally, one of the three FPGAs is used for receiving full frame of image data while other two of the three FPGAs are used for transmitting respective sub-images. For example, the third FPGA 33 composes a first input circuit 311, a second input circuit 316, a second process circuit 317, and an external memory (Direct Memory Access, DMA) 318. The first FPGA 31 comprises an auxiliary circuit 314, a select circuit 315, a first process circuit 312 and an output circuit 313. The second FPGA 32 is configured to be substantially the same as the first FPGA 31. In another example, the n=3 FPGAs includes a first FPGA 31, a second FPGA 32, and a third FPGA 33 (FIG. 4C). Optionally, two of the three FPGAs are used for receiving the full frame of image data while the third one of the three FPGAs is used for outputting respective sub-images. For example, the third FPGA 33 comprises a select circuit 315, a first process circuit 312 and an output circuit 313. The first FPGA 31 comprises a first input circuit 311, a second input circuit 316, a second process circuit 317, and an external memory 318. The second FPGA 32 is configured to be substantially the same as the first FPGA 31. Optionally, more FPGAs can be employed although two FPGAs can achieve the purpose of the present invention.

Optionally, the auxiliary circuit 314 in the respective FPGA 31 is further configured to receive at least a reference sub-image from an auxiliary circuit in another FPGA (32) that is electrically connected to said auxiliary circuit 314. The reference sub-image includes at least a portion of the first sub-image corresponding to another FPGA (32). The auxiliary circuit 314 is configured to determine the auxiliary sub-image corresponding to the respective FPGA 31 based on the reference sub-image. The auxiliary sub-image corresponding to the FPGA 31 includes at least a portion of the reference sub-image that is next to the first sub-image corresponding to the FPGA 31. In the embodiment, the auxiliary sub-image is determined to be the reference sub-image entirely. Optionally, the auxiliary sub-image can be a portion of the reference sub-image. Additionally, the auxiliary circuit 314 in the FPGA 31 is also configured to send a reference sub-image to another auxiliary circuit in the FPGA 32 and the reference sub-image sent by the auxiliary circuit 314 includes at least a portion of the first sub-image corresponding to the FPGA 31.

Optionally, the auxiliary circuit 314 of the respective FPGA 31 may obtain a first sub-image corresponding to the FPGA 31 received by the first input circuit 311 and to derive a reference sub-image from the first sub-image, and to send the reference sub-image to other auxiliary circuits. Optionally, after the auxiliary circuit 314 of the respective FPGA 31 receives the reference sub-image sent from other auxiliary circuits, it can determine the auxiliary sub-image corresponding to the FPGA 31. Then, the FPGA 31 is configured to send both the first sub-image and the auxiliary sub-image corresponding to the FPGA 31 to the first process circuit 312 of the FPGA 31. The first process circuit 312 performs an image process to enhance image-resolution of the first sub-image based on the auxiliary sub-image corresponding to the FPGA 31.

Optionally, a row number of pixels of the reference sub-image can be equal to a row number of pixels of the first sub-image and a column number of pixels of the reference sub-image can be equal to one half of a column number of pixels of the first sub-image, as shown in FIG. 3. Optionally, the column number of pixels of the reference sub-image can also be one third or one fourth of the column number of pixels of the first sub-image.

Optionally, the auxiliary circuit of a respective FPGA may be electrically connected to SOC 1 (of FIG. 1) and receive an auxiliary sub-image directly from the SOC 1.

Referred to FIG. 4A, the first FPGA 31 further includes a select circuit 315 and a second input circuit 316. The second input circuit 316 includes a target interface. Optionally, the target interface includes a display data transport interface selected from one of High Definition Multimedia Interface (HDMI) and Display Port (DP). In the respective FPGA 31, the first input circuit 311 and the first process circuit 312 are connected electrically via the select circuit 315. The select circuit 315 is also electrically connected with the output circuit 313 and the second input circuit 316.

In the embodiment, the select circuit 315 in the respective FPGA 31 is configured to select one of the first input circuit 311 and the second input circuit 316 to form a conduction path with the output circuit 313. Optionally, the select circuit 315 includes a multiplexer (MUX). In the embodiment, the first input circuit 311 in the respective FPGA 31 is configured, when it is in the conduction path with the output circuit 313, to receive a first sub-image corresponding to the respective FPGA 31 from the SOC 1 (FIG. 1). The second input circuit 316 in the respective FPGA 31 is configured, when it is in the conduction path with the output circuit 313, to receive an image from the target interface. The output circuit 313 in the respective FPGA 31 is configured, when it is in the conduction path with the first input circuit 311, to send a second sub-image to a timing-controller 2 (FIG. 1), and, when it is in the conduction path with the second input circuit 316, to send the image received by the second input circuit 316. The select circuit 315 acts like a switch and forms a conduction path between the output circuit and either the first input circuit or the second input circuit. In other words, for any moment, only one conduction path from one input circuit is formed in association with the output circuit to output an image coming from just one input circuit.

Figure 5:
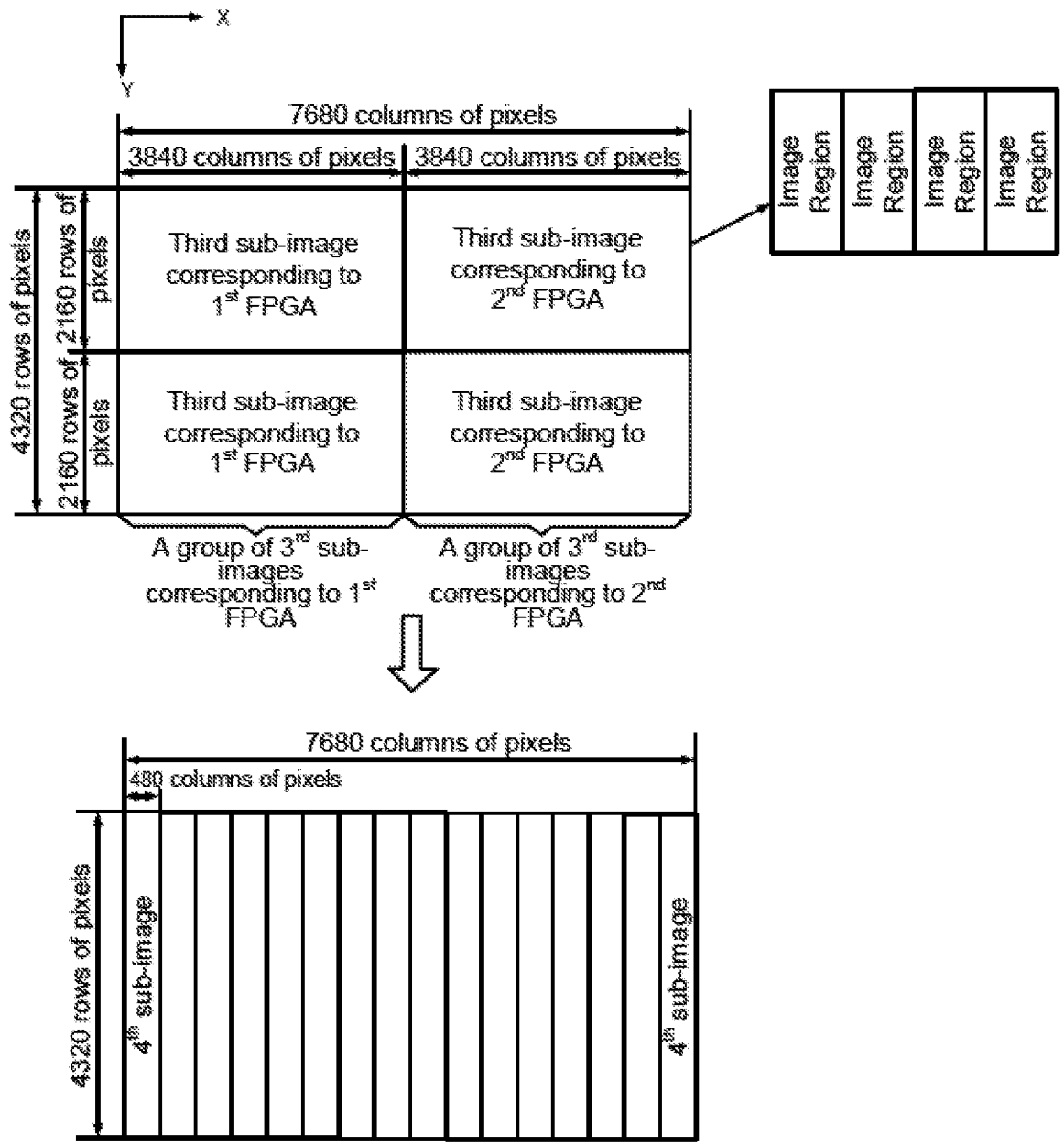
FIG. 5 is a schematic diagram of one frame of target image according to an embodiment of the present disclosure.

Optionally, the second input circuit 316 of the respective FPGA 31 is configured to obtain one group of third sub-images corresponding to the FPGA 31 from the target interface. Provided that the display controller 3 has n FPGAs total, correspondingly n groups of third sub-images respectively corresponding to the n FPGAs are combined to form one frame of target image. In this target image, the n groups of third sub-images are distributed sequentially along a row direction of pixels and a respective one group of third sub-images includes m third sub-images distributed along a column direction of pixels, where m is an integer greater than 1. In an example, n=2, m=2, as shown in FIG. 5 two groups of thud sub-images corresponding to two FPGAs form a target image. The two groups third sub-images are sequentially laid along the row direction X and the third sub-images in each group include two third sub-images sequentially laid along the column direction Y. Additionally, when the second input circuit 316 obtains a third sub-image from one target interface, it can receive the third sub-image via a multi-channel parallel-transported data stream. Optionally, the multi-channel parallel-transported data stream for the third sub-image can be multiple data streams respectively for multiple image regions sequentially distributed along the row direction of pixels. Optionally, the target interface includes a display data transport interface selected from one of High Definition Multimedia Interface (HDMI) and Display Port (DP).

Optionally, the second input circuit 316 includes m target interfaces, m≥2. Referring to FIG. 4A, the second input circuit 316 has two target interfaces. Optionally, the second input circuit 316 can have three, or four, or other number of target interfaces.

In the embodiment, the first FPGA 31 also includes a second process circuit 317 configured to divide a group of third sub-images corresponding to the FPGA 31 to multiple fourth sub-images. For example, one group of third sub-images is divided into 8 or 9 fourth sub-images. A total number of rows of pixels of the multiple fourth sub-images sequentially laid along the row direction are set to be equal to a row number of the target image. For example, referring to FIG. 5, the target image includes 4320 rows and 7680 columns of pixels. A third sub-image includes 2160 rows and 3840 columns of pixels. Then, a group of third sub-images corresponding to the respective FPGA can include 4320 rows and 3840 columns of pixels. The multiple fourth sub-images that divide every group of third sub-images in FIG. 5 can also have 4320 rows and 3840 columns of pixels with each fourth sub-image including 4320 rows and 480 columns of pixels (laid sequentially along the row direction). Optionally, the number of columns in every fourth sub-image can be 384 or others.

In the embodiment, the output circuit 313 of the first FPGA 31 is further configured to send the multiple fourth sub-images obtained by the second process circuit 317 to the timing-controller 2 (FIG. 1). Optionally, the output circuit 313 is configured to send the multiple fourth sub-images to the timing-controller 2 based on V-By-One standard protocol.

Optionally, the second process circuit 317 of the first FPGA 31 is electrically connected to an external memory associated with the FPGA 31. Optionally, each of the n FPGAs in the display controller 3 (FIG. 1) includes an external memory (not shown). For example, the external memory can be a DDR memory. When the second process circuit 317 is executed to divide a group of third sub-images to multiple fourth sub-images, the second process circuit 317 can send the group of third sub-images to the associated external memory. The external memory is configured to divide the group of third sub-images to multiple fourth sub-images and output the multiple fourth sub-images (back) to the second process circuit 317.

Optionally, referring to FIG. 4A, in the first FPGA 31, the output circuit 313 further includes a scan sub-circuit 3134 and an output sub-circuit 3132 electrically connected to each other. The first process circuit 312 and the select circuit 315 are connected electrically to the scan sub-circuit 3134. The output sub-circuit 3132 is configured to be electrically connected with the timing-controller 2.

In the embodiment the scan sub-circuit 3134 in the respective FPGA 31 is configured, when the first input circuit is in the conduction path with the output circuit, to perform a scan process to the second sub-image so that a scan mode of the second sub-image is set to a target scan mode. A scan node of an image corresponds to a scanning rate associated with the image being delivered on a display panel to display an image thereof. A target scan mode corresponds to a scanning rate that is set by the timing-controller 2 for the corresponding image delivered to the display panel. Again, the scan sub-circuit 3134 in the respective FPGA 31 is also configured, when the second input circuit is in the conduction path with the output circuit, to perform a scan process to the fourth sub-image so that the scan mode for the fourth sub-image is the target scan mode. Additionally, the output sub-circuit 3132 of the respective FPGA 31 is configured to send the image subjected to the scan process, i.e., the second sub-image or the fourth sub-image possessing the target scan mode.

Optionally, when the scan sub-circuit 3134 performs the scan process to a sub-image, it can firstly divide the sub-image to two parts. Each of the two parts can have row number of pixels equal to that of the sub-image while have column number of pixels equal to one half of that of the sub-image. In this option a clock frequency adjustment will be performed to each of the two parts of sub-image to make each part having a same clock frequency set in the timing-controller 2. For example, the clock frequency associated with each part of the sub-image is 148.5 MHz and will be adjusted to match with a clock frequency of 74.25 MHz in the timing-controller 2.

Optionally, referring to FIG. 4A again, in the FPGA 31, the output circuit 313 also includes a synchronize sub-circuit 3131. The scan sub-circuit 3134 is connected to the output sub-circuit 3132 via the synchronize sub-circuit 3131. A synchronize sub-circuit 3131 in the respective FPGA 31 is configured, after the scan sub-circuit 3134 performs the scan process, to synchronize clock signal associated with the FPGA with other clock signals associated with the rest (n-1) FPGAs in the display controller based on at least one clock signal. In the embodiment, the output sub-circuit 3132 in the respective FPGA is configured, after the synchronize sub-circuit 3131 complete the synchronize process, to send the sub-image subjected to the synchronize process to the timing-controller 2.

Optionally, in the display controller 3, n synchronize sub-circuits in respective n FPGAs all connect to one target clock signal source which is optionally a part of the display control system (FIG. 1). The synchronize sub-circuit 3131 in the respective one of the n FPGAs is configured to synchronize the clock signal thereof with those clock signals of synchronize sub-circuits respectively in all other (n-1) FPGAs based on the clock signal from the target clock signal source. In other words the n FPGAs are synchronized by commonly sharing a target clock signal source to ensure the n FPGAs can send images respectively with synchronized timing to the timing-controller.

Optionally, referring to FIG. 4A again, the output circuit 313 of the respective FPGA 31 also includes a first adjust sub-circuit 3133. The first process circuit 312 and the select circuit 315 are electrically connected to the scan sub-circuit 3134 via the first adjust sub-circuit 3133.

In the embodiment, the first adjust sub-circuit 3133 of the respective FPGA 31 is configured to perform a first image process to the image (to be sent to the timing-controller 2) including either the second sub-image or the fourth sub-image. The first image process is to enhance image quality. Here the image subjected to the first image process has a color mode configured as a red-green-blue (RGB) color mode. In an example, the first image process includes image quality enhancement color mode process or color-mode transformation (such converting YCbCr color mode to RGB color mode. Optionally, the image quality enhancement includes adjustments in multiple color parameters including contrast, brightness, color tone, and gamma curve. In particular, the image quality enhancement includes enhancing contrast, enhancing brightness, adjusting color tone, adjusting gamma curve. Optionally, enhancing contrast is based on a histogram equalization method or a filtering method. Optionally, adjusting color tone is based on a color-matrix correction method.

Optionally, referring to FIG. 4A again, the select circuit 315 of the respective FGPA 31 includes a first select sub-circuit 3151, a second adjust sub-circuit 3152, and a second select sub-circuit 3153. The second adjust sub-circuit 3152 is connected electrical to both the second select sub-circuit 3153 and the first select sub-circuit 3151. In the respective FGPA 31, the auxiliary circuit 314 is electrically connected to a first input terminal of the first select sub-circuit 3151. The second process circuit 317 is electrically connected to a second input terminal of the first select sub-circuit 3151. The first process circuit 312 is electrically connected to a first output terminal of the second select sub-circuit 3153. The output circuit 313 (such as the first adjust sub-circuit 3133 therein) is electrically connected to a second output terminal of the second select sub-circuit 3153. The first adjust sub-circuit 3133 and the first process circuit 312 are configured to perform target color-mode process for the corresponding images.

In the embodiment, the first select sub-circuit 3151 of the respective FPGA 31 is configured to select one of the first input terminal and the second input terminal to be connected with the second adjust sub-circuit 3152. The second select sub-circuit 3153 of the respective FPGA 31 is configured, when the first input terminal of the first select sub-circuit 3151 is connected to the second adjust sub-circuit 3152, to make the first output terminal of the second select sub-circuit 3153 to be connected with the first process circuit 312. The second select sub-circuit 3153 is further configured, when the second input terminal of the first select sub-circuit 3151 is connected to the second adjust sub-circuit 3152, to make the second output terminal of the second select sub-circuit 3153 to be connected with the second adjust sub-circuit 3152.

In the embodiment, the second adjust sub-circuit 3152 in the respective FPGA 31 is configured, when the first input terminal of the first select sub-circuit 3151 is connected with the second adjust sub-circuit 3152, to perform a second image process to the first sub-image and the auxiliary sub-image corresponding to the respective FPGA 31 so that color modes of the sub-images thereof are all converted to a target color mode. The second adjust sub-circuit 3152 further is configured, when the second input terminal of the first select sub-circuit 3151 is connected to the second adjust sub-circuit 3152, to perform the second image process to the multiple fourth sub-images so that color modes thereof are all converted to the target color mode. Optionally, the second image process is to adjust color mode or convert one color mode to another color mode.

As the second adjust sub-circuit 3152 unifies the color modes of the first sub-image and the auxiliary sub-image corresponding to the respective FPGA 31 to a target color mode, the first process circuit 312 is able to conveniently perform the process of enhancing image-resolution to the first sub-image based on the target color mode of the first sub-image and the auxiliary sub-image to obtain the second sub-image. Alternatively, as the second adjust sub-circuit 3152 can unify color modes of multiple fourth sub-images to a target color mode, the first adjust sub-circuit 3133 is able to perform the first image process to those fourth sub-images with the target color mode.

In an example, assuming that the color mode of the first sub-image and auxiliary sub-image is RGB mode and the target color mode is YCbCr mode, then, the second adjust sub-circuit 3152 of the respective FPGA 31 is to adjust the color modes of the first sub-image and the auxiliary sub-image from RGB mode to YCbCr mode when the first input circuit 311 is conducted with the second adjust sub-circuit 3152. Optionally, the target color mode can be other modes such as hues saturation brightness (HSB) color mode.

In another example, assuming that the color mode of the fourth sub-images is RGB mode and the target color mode is YCbCr mode, then, the second adjust sub-circuit 3152 of the respective FPGA 31 is to adjust the color mode of the fourth sub-images from RGB mode to YCbCr mode when the second input circuit 316 is conducted with the second adjust sub-circuit 3152.

In some embodiments, when the display controller receives an initial image with a lower resolution (say 4K), the display controller can process the initial image to obtain n second sub-images, and can send the n second sub-images to the timing-controller or TCON using a V-By-One standard protocol. And, the n second sub-images, which are processed by the display controller, can form an image with a higher resolution (say 8K). When the display controller receives a target image, the display controller can perform adjustment processes to the target image to obtain multiple fourth sub-images, and to send the multiple fourth sub-images using the V-By-One standard protocol to the timing-controller or TCON. Therefore, the display controller according to some embodiments of the present disclosure can enhance image-resolution of the initial image, e.g., from 4K resolution to 8K resolution. The display controller of the present disclosure did not adjust image-resolution of the target image (say in 8K resolution) and the multiple fourth sub-images outputted to the timing-controller still has a same 8K image-resolution as that of the target image. Therefore, the display controller of the present disclosure that is based on two or more 4K (or generally lower) resolution FPGAs implemented in the display control system (FIG. 1) can be used to control an 8K (or generally higher) resolution display panel to display images with 8K (or generally higher) resolution. Since generally lower resolution FPGAs are employed with each being used handle less data associated with lower-resolution images and are manufactured with simpler circuitry structures, the overall cost is lower comparing the display controller with complicate high-resolution FPGA.

In another aspect, the present disclosure provides a display apparatus including a display panel and the display control system described herein. A timing-controller in the display control system is connected to the display panel, and to send corresponding high-resolution images that have been subjected to image-resolution advancement and color mode adjustment processes based on lower-resolution initial images to the display panel.

Figure 6:
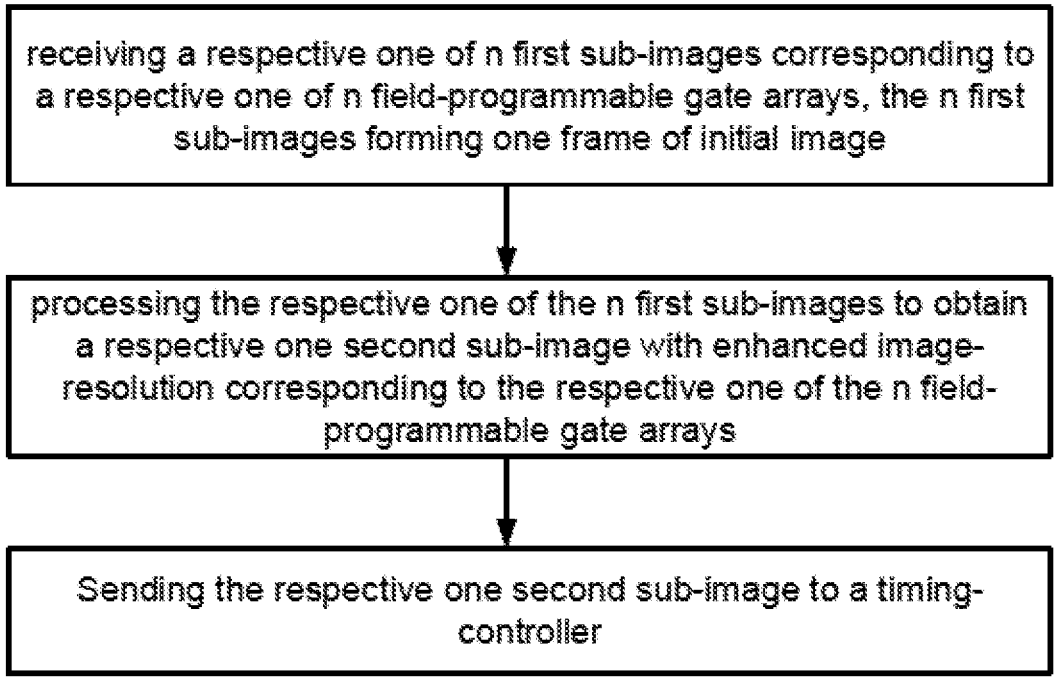
FIG. 6 is a flow chart illustrating a display control method according to an embodiment of the present disclosure.

In yet another aspect, the present disclosure provides a display control method FIG. 6 shows a simplified flow chart illustrating the method, which is executed using a display controller including n≥2 FPGAs. The display controller is connected to a SOC and a timing-controller (or TCON). Particularly, a respective one of the n FPGAs includes a first input circuit and an output circuit and a first process circuit connected between the first input circuit and the output circuit. The method includes at least a step of receiving a first sub-image corresponding to a respective one of the n FPGAs from the SOC. Here, n first sub-images corresponding respectively to the n FPGAs are combined to form one frame of initial image. The step is executed by the first input circuit of the FPGA as described in the specification herein. The method further includes a step of processing the first sub-image corresponding to the respective one of the n FPGAs to enhance image-resolution and obtain a second sub-image corresponding to the respective one of the n FPGAs. This step is executed in the first process circuit of the FPGA as described in the specification herein. Additionally, the method includes a step of sending the second sub-image to the TCON. This step can be executed by the output circuit of the FPGA as described in the specification herein.

Figure 7:
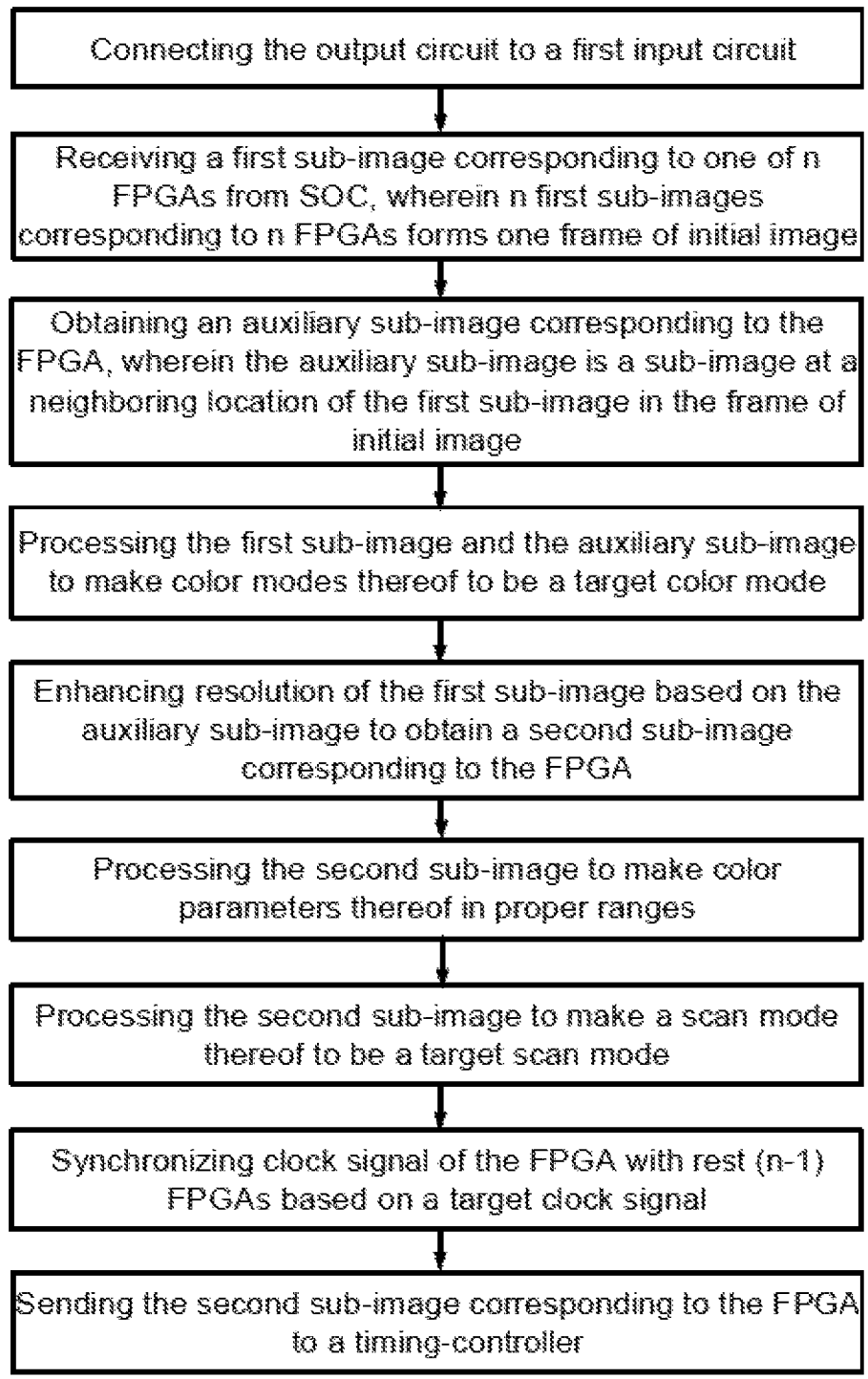
FIG. 7 is a flow chart illustrating a display control method according to another embodiment of the present disclosure.

FIG. 7 shows a flow chart illustrating a display control method according to another embodiment of the present disclosure. The method is used in each FPGA of n FPGAs in a display controller of the present disclosure as shown in FIG. 2 and FIG. 4A. Referring to FIG. 7, the method includes a step of forming a conduction path from a first input circuit or a second input circuit to an output circuit, via a select circuit. The method further includes a step of when the first input circuit and the output circuit are in the conduction path, receiving by the first input circuit a first sub-image corresponding to a respective one of n FPGAs from SOC. The first sub-image is one of n first sub-images respectively corresponding to the n FPGAs that can be combined to form one frame of initial image.

Additionally, the method includes a step of obtaining an auxiliary sub-image corresponding to the respective one of the n FPGAs by an auxiliary circuit in the FPGA. The method then includes a step of processing the first sub-image and the auxiliary sub-image, by a second adjust sub-circuit in the select circuit of the FPGA, to make color modes thereof to be a target color mode. The method also includes a step of enhancing resolution of the first sub-image based on the auxiliary sub-image, by the first process circuit of the FPGA, to obtain a second sub-image corresponding to the respective one of the n FPGAs.

Furthermore, the method includes a step of processing the second sub-image, by a first adjust sub-circuit in the output circuit of the FPGA, to make color parameters thereof in proper ranges. The method further includes a step of processing the second sub-image, by a scan sub-circuit in the output circuit of the FPGA, to make a scan mode thereof to be a target scan mode such that a scanning rate associated with the second sub-image is matched with a scanning rate set by the TCON.

Moreover, the method includes a step of synchronizing clock signal of the FPGA with rest (n-1) FPGAs based on a target clock signal. This step can be executed by a synchronize sub-circuit in the output circuit of the FPGA. Then, the method includes a step of sending the second sub-image having the target scan mode to the TCON after completing clock signal synchronization.

Figure 8:
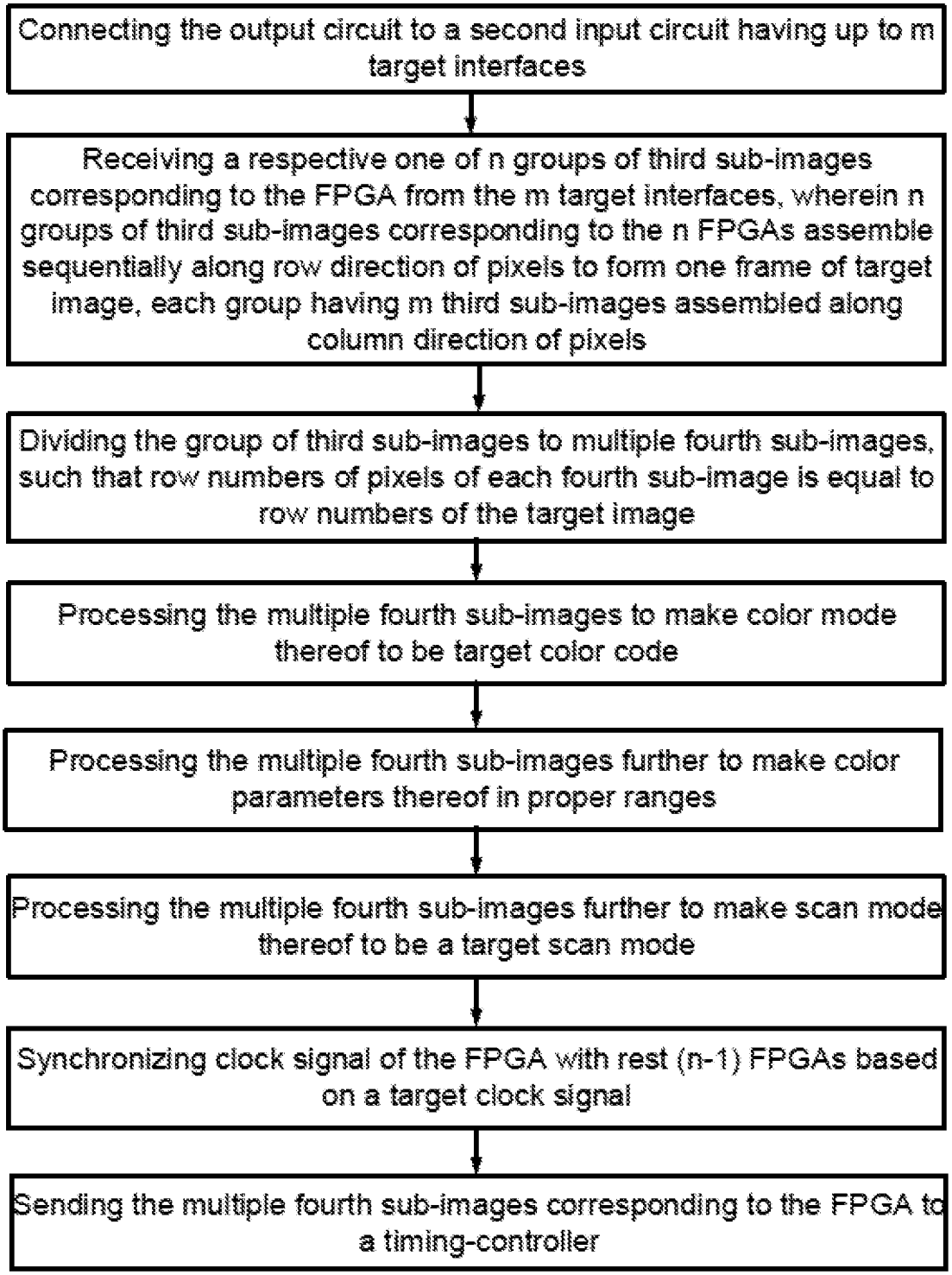
FIG. 8 is a flow chart illustrating a display control method according yet another embodiment of the present disclosure.

FIG. 8 shows another flow chart illustrating a display control method according to another embodiment of the present disclosure. The method is used in each FPGA of n FPGAs in a display controller of the present disclosure as shown in FIG. 2 and FIG. 4A. Referring so FIG. 8, the method includes a step of after forming, a conduction path from a second input circuit to an output circuit via a select circuit, obtaining a group of third sub-images corresponding to the respective one of the n FPGAs from m target interfaces. The group of third sub-images is one of n groups of third sub-images respectively corresponding to the n FPGAs that can be combined to form one frame of target image. In particular, the n groups of third sub-images are sequentially distributed along a row direction of pixels and each group of third sub-image includes in third sub-images sequentially laid along a column direction of pixels. This step can be executed by the second input circuit of the FPGA.

The method further includes a step of dividing the group of third sub-images to multiple fourth sub-images by a second process circuit of the FPGA, such that row numbers of pixels of each fourth sub-image is equal to row numbers of the target image.

Additionally, the method includes a step of processing the multiple fourth sub-images, by a second adjust sub-circuit in the select circuit of the FPGA, to make color mode thereof to be target color code. The method also includes step of processing the multiple fourth sub-images further, by a first adjust sub-circuit in the output circuit of the FPGA, to make color parameters thereof in proper ranges.

Furthermore, the method includes a step of processing the multiple fourth sub-images further, by a scan sub-circuit in the output circuit of the FPGA, to make scan mode thereof to be a target scan mode. The method further includes a step of synchronizing clock signal of the FPGA with rest (n-1) FPGAs based on a target clock signal. This step can be executed by a synchronize sub-circuit in the output circuit of the FPGA.

Moreover, the method includes a step of sending the multiple fourth sub-images corresponding to the FPGA by the output circuit to a timing-controller TCON.

Figure 9:
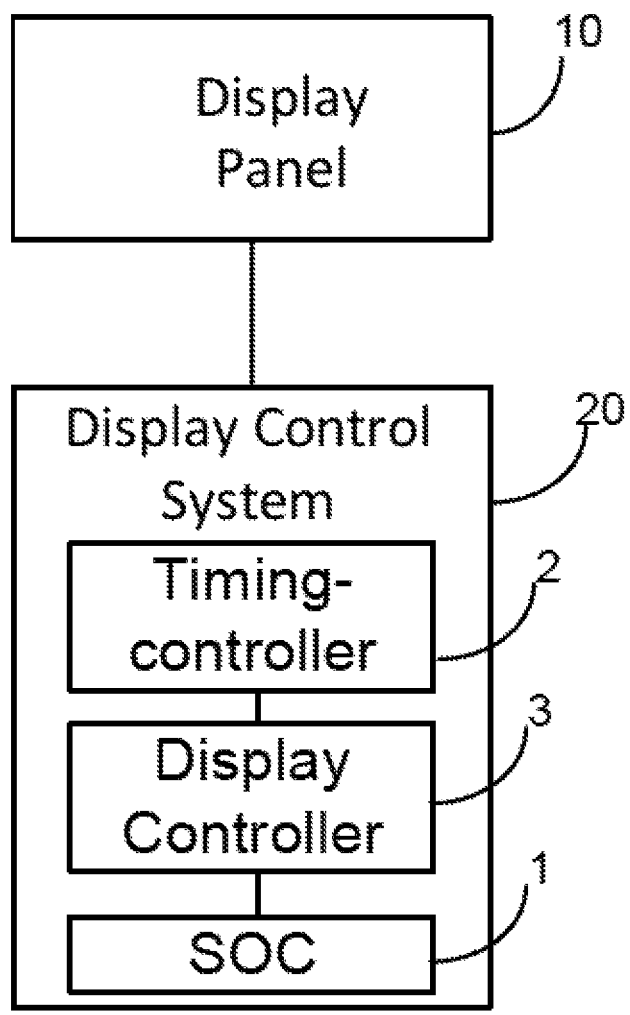
FIG. 9 is a block diagram of a display apparatus according to an embodiment of the present disclosure.

In yet another aspect, the present disclosure provides a display apparatus as shown in FIG. 9 including at least a display panel 10 and a display control system 20. Here the display control system 20 is the display control system shown in FIG. 1, including a system-on-chip (SOC) 1 coupled to a display controller 3 which further is coupled to a timing-controller TCON 2. The timing-controller TCON 2 is able to send images sent by the display controller 3 in the display control system 20 to the TCON 2. Optionally, the display apparatus can be one of liquid crystal display panel, electronic paper, organic light-emitting diode display panel, smart phone, tablet computer, television, displayer, notebook computer, digital picture frame, navigator, and any product or component having a display function.

Figure 10:
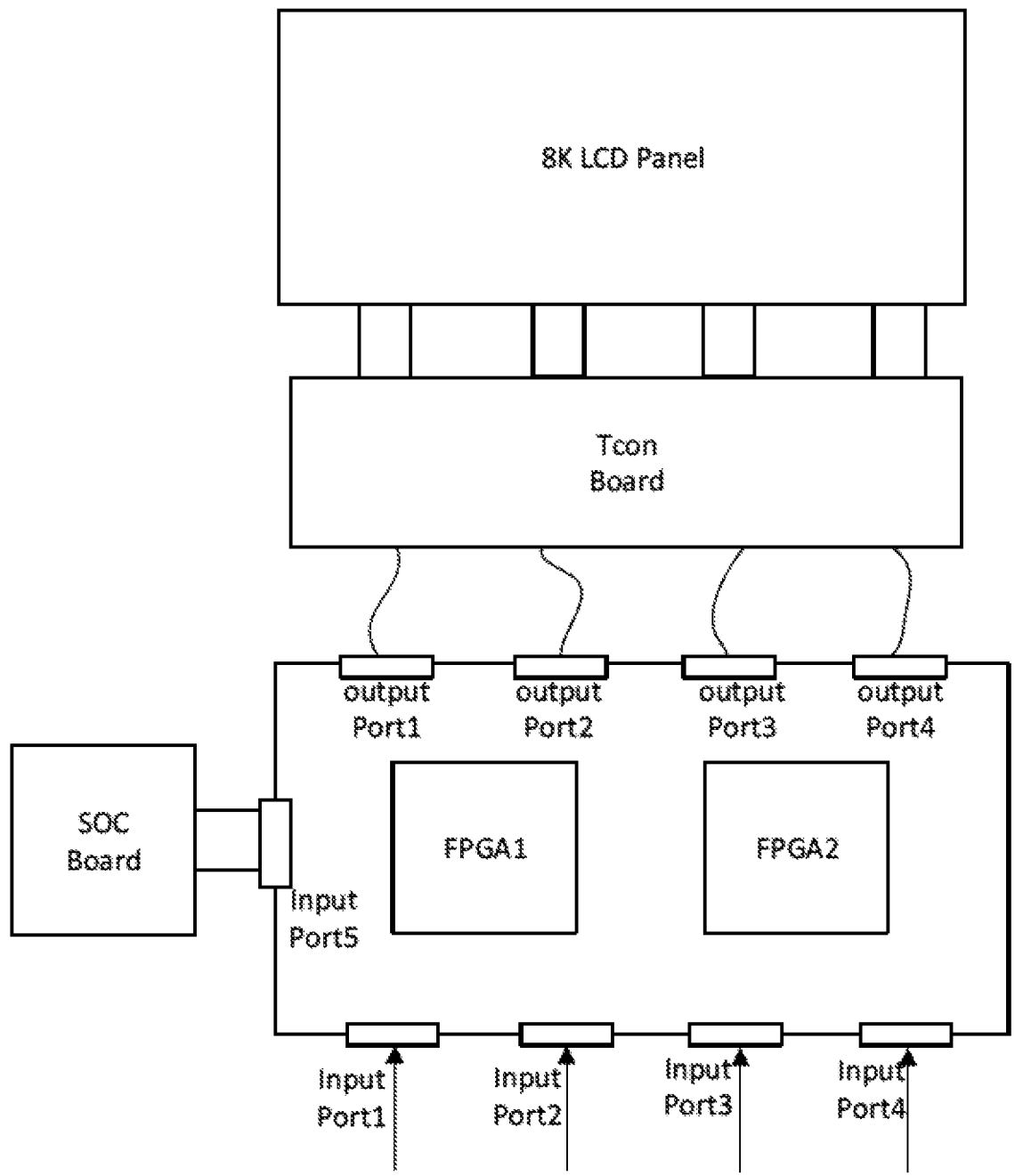
FIG. 10 is a circuit diagram of an 8K display apparatus driven by a display controller having two FPGAs according to a specific embodiment of the present disclosure.

FIG. 10 shows a circuit diagram of an 8K display apparatus driven by a display controller having two FPGAs according to a specific embodiment of the present disclosure. Referring to FIG. 10, the 8K display apparatus includes a display controller containing two FPGA chips (FPGA1 and FPGA2). Optionally, the display controller is substantially the same as the display controller 3 described herein in FIG. 1. Each FPGA chip can be configured to just handle 4K-resolution data to save cost. The display controller includes 4 input ports (Input Port1, Input Port2, Input Port3, Input Port4) as target interfaces based on HDMI2.0 or DP1.3 protocols as target image signal inputs. Each input port is responsible of ¼ region of full frame of image. Optionally, Input Port1 and Input Port2 are connected to FPGA1 and Input Port3 and Input Port4 are connected to FPGA2. Each FPGA can receive 3840×4320 size of data. At the same time, the display controller includes a fifth input channel from a SOC display control board. Optionally, the SOC chip is substantially the SOC 1 described herein in FIG. 1. Optionally, SOC display control board connects to each FPGA to input a 4K-resolution image data. After the two FPGAs perform respective data processing with 4K-resolution, the combined data can be formatted in 8K-resolution and sent to a timing-controller (Tcon). The data can be transferred via V-By-One or LVDS standard in 4K-resolution at 60 Hz per frame and can be divided into two parts (1920×2160) into the two FPGAs respectively. Tcon is substantially the same as TCON described herein in FIG. 1. The Tcon then use the combined data to drive a 8K-resolution LCD panel to display image in 8K resolution.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on foe number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display controller comprising:
n field-programmable gate arrays (FPGAs), wherein n is an integer greater than 1;
wherein a respective one of the n FPGAs comprises a first input circuit and an output circuit and a first process circuit connected between the first input circuit and the output circuit;
wherein the first input circuit is configured to receive a respective one first sub-image corresponding to the respective one of the n FPGAs, wherein n first sub-images respectively corresponding to the n FPGAs is combined to form one frame of initial image;
wherein the first process circuit is configured to enhance image-resolution of the respective one first sub-image corresponding to the respective one of the n FPGAs to obtain a respective one second sub-image corresponding to the respective one of the n FPGAs; and
wherein the output circuit is configured to deliver the respective one second sub-image corresponding to the respective one of the n FPGAs to a timing-controller;
wherein the respective one of the n FPGAs further comprises an auxiliary circuit connected to the first process circuit;
wherein the auxiliary circuit is configured to obtain an auxiliary sub-image corresponding to the respective one of the n FPGAs, the auxiliary sub-image is a sub-portion within the one frame of initial image physically next to the first sub-image corresponding to the respective one of the n FPGAs;
wherein the auxiliary circuit is further configured to enhance image-resolution of the first sub-image corresponding to the respective one of the n FPGAs based on the auxiliary sub-image; and
wherein the first input circuit in a respective one of the n FPGAs is configured to couple with the auxiliary circuit therein via the first process circuit therein; the auxiliary circuits respectively in two of the n FPGAs are in connection, wherein two first sub-images corresponding respectively to the two of the n FPGAs are two neighboring portions in the one frame of initial image.

2. The display controller of claim 1, wherein the image-resolution of the second sub-image is at least two times of that of the first sub-image.

3. The display controller of claim 1,
wherein the auxiliary circuit is configured
to receive a reference sub-image sent from another auxiliary circuit in connection, wherein the reference sub-image comprises at least one portion of the first sub-image corresponding to a respective one of the n FPGAs comprising the another auxiliary circuit; and
to determine the auxiliary sub-image corresponding to the respective one of the n FPGAs based on the reference sub-image, wherein the auxiliary sub-image comprises at least one portion of the reference sub-image.

4. The display controller of claim 3, wherein a total number of rows of pixels in the reference sub-image is equal to a total number of rows of pixels in the first sub-image; and
a total number of columns of pixels in the reference sub-image is one half of a total number of columns of pixels in the first sub-image.

5. The display controller of claim 3, wherein the respective one of the n FPGAs further comprises a select circuit configured to connect the first input circuit with the first process circuit, and a second input circuit having a target interface and being connected with the output circuit via the select circuit;
wherein the select circuit is configured to select one of the first input circuit and the second input circuit to form a conduction path with the output circuit; and
the output circuit is configured to deliver the respective one second sub-image corresponding to the respective one of the n FPGAs to the timing-controller when the output circuit is in the conduction path with the first input circuit which receives the corresponding one first sub-image.

6. The display controller of claim 5, wherein the respective one of the n FPGAs further comprises a second process circuit connected between the second input circuit and the select circuit,
wherein a respective one second input circuit of the respective one of the n FPGAs is configured to receive a respective group of n groups of third sub-images corresponding to the respective one of the n FPGAs from the target interface, wherein the n groups of third sub-images respectively corresponding to the n FPGAs are combined sequentially along row direction of pixels to form one frame of target image, wherein the respective group of the n groups of third sub-images includes m number of third sub-images sequentially along column direction of pixels, where m is an integer greater than 1;
wherein a respective one second process circuit of the respective one of the n FPGAs is configured to divide the respective group of the n groups of third sub-images to multiple fourth sub-images, wherein a total number of rows of pixels of a respective one fourth sub-image is equal to a total number of rows of pixels of the target image.

7. The display controller of claim 6, wherein a respective one output circuit of the n FPGAs is configured to deliver the multiple fourth sub-images to the timing-controller when the output circuit is in the conduction path with the second input circuit.

8. The display controller of claim 7, wherein the respective one output circuit of the n FPGAs further comprises a scan sub-circuit connected to both the first process circuit and the select circuit and an output sub-circuit connected to the timing-controller;
wherein the scan sub-circuit is configured to:
perform a scan process to the respective one second sub-image when the output circuit is in the conduction path with the first input circuit to make a scanning rate associated with the respective one second sub-image to be a target scanning rate set by the timing-controller; or
perform a scan process to a respective one of the multiple fourth sub-images when the output circuit is in the conduction path with the second input circuit to make a scanning rate associated with the respective one of the multiple fourth sub-images to be a target scanning rate set by the timing-controller.

9. The display controller of claim 8, wherein the respective one output circuit of the n field-programmable gate arrays further comprises a synchronize sub-circuit connected to the scan sub-circuit and the output sub-circuit, wherein the synchronize sub-circuit is configured to perform a clock signal synchronization with each and every other synchronize sub-circuits of a corresponding (n-1) number of field-programmable gate arrays other than the respective one of the n FPGAs based on at least a single target clock signal before the output sub-circuit sends the respective one second or fourth sub-image that has been subjected the scan process to the timing-controller.

10. The display controller of claim 9, wherein the respective one output circuit of the n field-programmable gate arrays further comprises a first adjust sub-circuit configured to connect both the first process circuit and the select circuit with the scan sub-circuit, wherein the first adjust sub-circuit is configured to perform a first image process to the respective one second or fourth sub-image in red-green-blue color mode for enhancing image quality before the output sub-circuit sends the respective one second or fourth sub-image that has been subjected to the first image process.

11. The display controller of claim 10, wherein the respective one select circuit of the n FPGAs comprises a first select sub-circuit, a second adjust sub-circuit, and a second select sub-circuit connected to the first select sub-circuit and the first select sub-circuit, the auxiliary circuit being connected to a first input terminal of the first select sub-circuit, the second process circuit being connected to a second input terminal of the first select sub-circuit, the first process circuit being connected to a first output terminal of the second select sub-circuit, and the output circuit being connected to a second output terminal of the second select sub-circuit;
wherein the first select sub-circuit is configured to select one of the first input terminal and the second input terminal to be in a conduction path with the second adjust sub-circuit;
wherein the second select sub-circuit is configured to select the first output terminal to connect with the first process circuit when the first input terminal is connected to the second adjust sub-circuit and to select the second output terminal to connect with the second adjust sub-circuit when the second input terminal is connected to the second adjust sub-circuit.

12. The display controller of claim 11, wherein the second adjust sub-circuit is configured to perform a second image process to the respective one first sub-image and the respective one auxiliary sub-image corresponding to the respective one of the n FPGAs for converting image color codes thereof to a target color mode when the first input terminal is connected to the second adjust sub-circuit; and to perform a second image process to the respective multiple fourth sub-images corresponding to the respective one of the n FPGAs for converting image color modes thereof to a target color mode when the second input terminal is connected to the second adjust sub-circuit.

13. The display controller of claim 1, wherein a respective one output circuit of the respective one of the n FPGAs is configured to deliver an image to the timing-controller based on V-By-One standard protocol.

14. A display control system comprising:
the display controller of claim 1;
a system-on-chip; and
a timing-controller;
wherein the system-on-chip is coupled to the display controller to provide a respective one of n first sub-images corresponding to a respective one of n FPGAs in the display controller to generate a respective one second sub-image; and
the timing-controller is coupled to the display controller to receive n second sub-images generated from then first sub-images which are n portions of one frame of initial image.

15. A display apparatus comprising a display panel and the display control system of claim 14, wherein the timing-controller connected between the display control system and the display panel.

16. A display control method using a display controller:
wherein the display controller comprises n field-programmable gate arrays (FPGAs), wherein n is an integer greater than 1;
a respective one of the n FPGAs comprises a first input circuit and an output circuit and a first process circuit connected between the first input circuit and the output circuit;
the method comprises:
receiving a respective one of n first sub-images corresponding to a respective one of the n FPGAs by the first input circuit;
combining n first sub-images respectively corresponding to the n FPGAs into one frame of initial image;
processing, by the first process circuit, the respective one of the n first sub-images corresponding to the respective one of the n FPGAs to obtain a respective one second sub-image with enhanced image-resolution corresponding to the respective one of the n FPGAs; and
sending, by the output circuit, the respective one second sub-image corresponding to the respective one of the n FPGAs to a timing-controller;
wherein the respective one of the n FPGAs further comprises an auxiliary circuit connected to the first process circuit;
the method further comprises:
obtaining, by the auxiliary circuit, an auxiliary sub-image corresponding to the respective one of the n FPGAs, wherein the auxiliary sub-image is a sub-portion within the one frame of initial image physically next to the first sub-image corresponding to the respective one of the n FPGAs; and
enhancing, by the auxiliary circuit, image-resolution of the first sub-image corresponding to the respective one of the n FPGAs based on the auxiliary sub-image; and
coupling the first input circuit in a respective one of the n FPGAs with the auxiliary circuit therein via the first process circuit therein;
wherein the auxiliary circuits respectively in two of the n FPGAs are in connection; and
two first sub-images corresponding respectively to the two of the n FPGAs are two neighboring portions in the one frame of initial image.

* * * * *